United States Patent
Krenz et al.

(10) Patent No.: US 12,293,671 B2
(45) Date of Patent: May 6, 2025

(54) FLIGHT PLAN RULES BASED CONFORMITY CHECK

(71) Applicant: Rockwell Collins, Inc., Cedar Rapids, IA (US)

(72) Inventors: Michael J. Krenz, Roscoe, IL (US); Eric N. Anderson, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 220 days.

(21) Appl. No.: 17/991,571

(22) Filed: Nov. 21, 2022

(65) Prior Publication Data
US 2024/0169843 A1 May 23, 2024

(51) Int. Cl.
| G08G 5/21 | (2025.01) |
| G08G 5/34 | (2025.01) |
| G08G 5/55 | (2025.01) |
| G08G 5/59 | (2025.01) |
| G08G 5/74 | (2025.01) |

(52) U.S. Cl.
CPC .......... *G08G 5/21* (2025.01); *G08G 5/34* (2025.01); *G08G 5/55* (2025.01); *G08G 5/59* (2025.01); *G08G 5/74* (2025.01)

(58) Field of Classification Search
None
See application file for complete search history.

(56) References Cited

U.S. PATENT DOCUMENTS

| 6,289,277 B1* | 9/2001 | Feyereisen | G01C 21/005 340/945 |
| 8,793,038 B1* | 7/2014 | Schultz | G08G 5/0034 701/410 |
| 10,867,520 B2 | 12/2020 | Heiberg et al. | |
| 2009/0037212 A1* | 2/2009 | Chen | G06Q 10/10 705/5 |
| 2009/0319100 A1* | 12/2009 | Kale | G08G 5/0013 701/4 |
| 2010/0030401 A1 | 2/2010 | Rogers et al. | |
| 2012/0253562 A1* | 10/2012 | Wachenheim | G08G 5/34 701/4 |
| 2012/0296496 A1* | 11/2012 | Hedrick | G08G 5/0047 701/3 |
| 2015/0279218 A1* | 10/2015 | Irrgang | G07C 5/0816 701/3 |
| 2016/0093218 A1* | 3/2016 | Hale | G08G 5/0091 701/120 |
| 2019/0033862 A1* | 1/2019 | Groden | G05D 1/0088 |

(Continued)

OTHER PUBLICATIONS

Extended European Search Report dated Apr. 19, 2024; European Application No. 23207678.6.

*Primary Examiner* — Daniel L Greene
(74) *Attorney, Agent, or Firm* — Suiter Swantz IP

(57) ABSTRACT

Whenever an avionics computer system receives a flight plan, the avionics computer system performs rules-based conformity checks with respect to a predefine set of rules/thresholds. The rules may be general aviation best practices (no rate of elevation change beyond some threshold, no single change in direction beyond some threshold, etc.) or specific to the aircraft (no violation of an operational ceiling, no violation of some defined fuel reserve, etc.). Violations of the rules and criteria are communicated to crew members via visual indicia of such violations, including the relative severity.

16 Claims, 4 Drawing Sheets

(56) References Cited

U.S. PATENT DOCUMENTS

| | | | |
|---|---|---|---|
| 2019/0108466 A1* | 4/2019 | Khan | G05D 1/0005 |
| 2020/0013295 A1* | 1/2020 | Moravek | G08G 5/21 |
| 2020/0058225 A1* | 2/2020 | Heiberg | B64C 13/18 |

* cited by examiner

FLIGHT PLAN RULES BASED CONFORMITY CHECK

BACKGROUND

Up-loaded flight plans may contain errors that go unnoticed by the crew. This may be especially true for complex flight plans with potentially hundreds of waypoints. The existing methodology requires the pilot not flying to review and validate the new flight plan before accepting it. It would be advantageous if a system and method existed to identify discontinuities and untenable segments with respect to characteristics of the aircraft.

SUMMARY

In one aspect, embodiments of the inventive concepts disclosed herein are directed to a system and method for receiving a flight plan or flight plan alteration, and comparing the flight plan to a set of rules and criteria defined generally for best practices, and/or specific to the aircraft.

In a further aspect, violations of the rules and criteria are communicated to crew members via visual indicia of such violations, including the relative severity.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Figure 1:
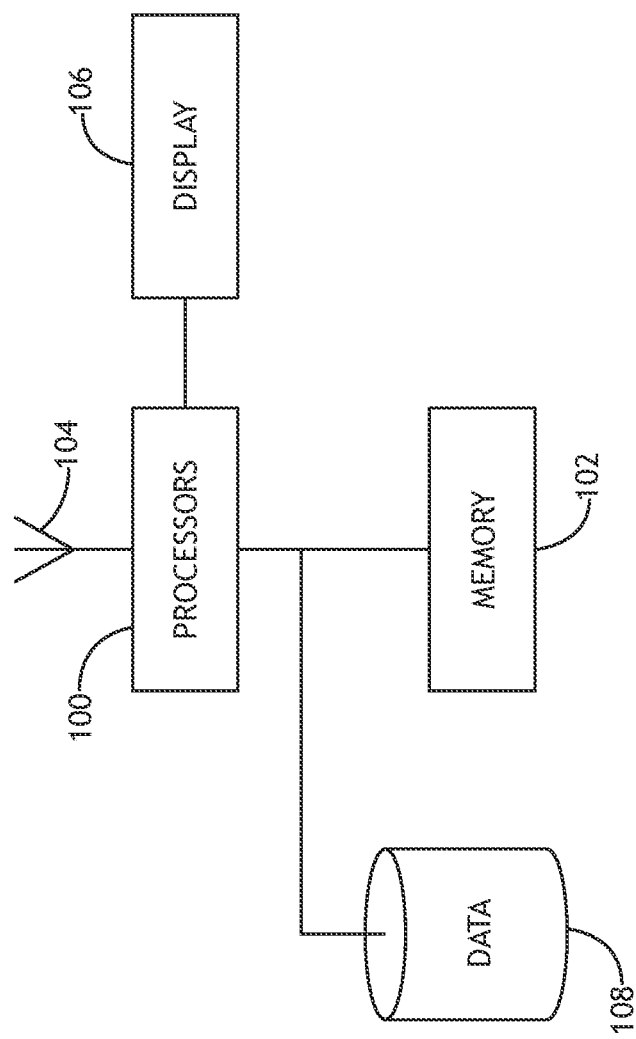
FIG. 1 shows a block diagram of a system for implementing an exemplary embodiment.

Before explaining various embodiments of the inventive concepts disclosed herein in detail, it is to be understood that the inventive concepts are not limited in their application to the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1*a*, 1*b*). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Also, while various components may be depicted as being connected directly, direct connection is not a requirement. Components may be in data communication with intervening components that are not illustrated or described.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in at least one embodiment" in the specification does not necessarily refer to the same embodiment. Embodiments of the inventive concepts disclosed may include one or more of the features expressly described or inherently present herein, or any combination or sub-combination of two or more such features.

Broadly, embodiments of the inventive concepts disclosed herein are directed to a system and method for receiving a flight plan or flight plan alteration, and comparing the flight plan to a set of rules and criteria defined generally for best practices, and/or specific to the aircraft. Violations of the rules and criteria are communicated to crew members via visual indicia of such violations, including the relative severity.

Referring to FIG. 1, a block diagram of an avionics system for implementing an exemplary embodiment is shown. The avionics system includes a processor 100, memory 102 connected to the processor 100 for storing processor executable code, a datalink device 104 for receiving flight plans and/or flight plan updates. The processor 100 is configured to receive a flight plan update and analyze the flight plan update according to a set of predefined rules stored in a data storage device 108 embodying a procedural database. The processor 100 may receive the flight plan update from the memory 102 (i.e., a precomputed, stored flight plan), a portable memory device (i.e., a USB stick, etc.), from a remote source via the datalink device 104 (i.e., radio interfaces with specific protocols for communication with air traffic control, airline/commercial dispatchers, etc.), from an onboard personal electronic device via a wired interface (i.e., USB, Ethernet) or wireless interface (i.e., Bluetooth, WiFi) either with or without the use of an Avionics Interface Device.

The predefined rules may be generalized aviation best practices and/or specific to the aircraft. In at least one embodiment, the processor 100 may identify path changes, and compare the path changes to predefined threshold. For example, the processor 100 identifies elevation changes within the flight plan update and compares a rate of elevation change with a general threshold or a specific threshold defined by the capabilities of the aircraft; furthermore, the elevation changes may be compared to some defined operational ceiling of the aircraft. In at least one embodiment, the processor 100 may apply certain rules-based checks to elevation changes with respect to the rest of the flight plan. For example, the processor 100 may verify that the flight plan includes a climb to some maximum altitude and a corresponding descent to a landing field elevation at the destination. The processor 100 may identify some minimum safe altitude for each segment of a flight plan based a correlation to the local terrain.

In at least one embodiment, the processor 100 may identify altitude constraints associated with specific waypoints. The processor 100 may identify minimum altitude constraints and determine if the aircraft has sufficient performance metrics to meet those constraints; furthermore, the processor 100 may determine if the aircraft has sufficient performance to descend fast enough to descent constraints. Also, the processor 100 may analyze the sequence of altitude changes defined by a flight plan. For example, it would be unusual for a flight plan to require a descent, then a climb again before another descent. The processor 100 may analyze the sequence of changes for progressively higher altitude constraints up to maximum cruise altitude, and progressively lower constraints until landing.

Likewise, the processor 100 identifies changes in direction defined by one or more new waypoints and compare an angular change in direction to a predefined threshold. The processor 100 may also identify any discontinuities in the flight plan generated by newly added waypoints.

In at least one embodiment, the processor 100 may analyze the flight plan update for threshold violations that may not be inherent in the flight plan update. For example, the processor 100 may determine an expected fuel reserve in light of the flight plan update and compare the expected fuel reserve to a threshold minimum and/or a change in the prior fuel reserve or more than some threshold (i.e., 5%). It may be appreciated that a change in expected fuel reserve beyond the predefined threshold, either a decrease or increase in fuel reserves, may indicate a significant error that should be investigated by the flight crew.

In one example, where an existing flight plan indicates 1000 pounds of fuel left at the destination, and a flight plan update results in the processor 100 predicting 800 pounds of fuel left at the destination, the flight crew should review the change before accepting. Alternatively, where the flight plan update indicates 2000 pounds of fuel left at the destination, the flight crew should review the change before accepting because a legitimate flight plan change is unlikely to produce such a fuel savings; normally a flight plan update should not result in more than about a 5% change. Furthermore, otherwise valid updates to a flight plan may extend the duration of a flight. Where a flight plan update changes the arrival time (i.e., 9:30 AM to 11:25 AM), the added time may have a significant impact to fuel usage. The processor 100 may determine if a change to expected arrival time is beyond a predefined threshold.

In at least one embodiment, identified threshold violations or other problems with the received flight plan update may be visualized on a display 106 in data communication with the processor 100. In at least one embodiment, the processor 100 may render a current flight, or some relevant portion or a current flight plan, and overlay changes to the current flight plan embodied in the flight plan update in a visual distinct way, such as via dashed lines. Furthermore, any elements of the flight plan update that exceed predefined thresholds, or otherwise violate the predefined rules, may be rendered in a further visually distinct way, such as with color coding according to a severity metric (i.e., a minor discontinuity rendered in yellow while a substantial change in fuel reserves rendered in red).

In at least one embodiment, the processor 100 is configured to receive crew approval or rejection of the flight plan update, such as via a touch screen interface in the display device 106. The flight plan update may then be incorporated into the current flight plan, or replace the current flight.

Figure 2:
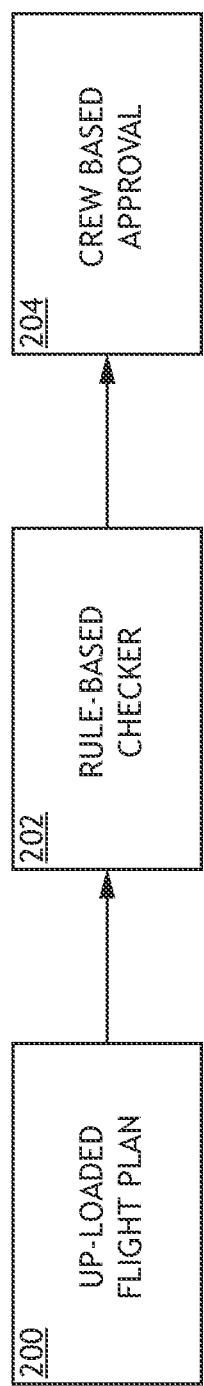
FIG. 2 shows a flowchart of a method according to an exemplary embodiment.

Referring to FIG. 2, a flowchart of a method according to an exemplary embodiment is shown. An avionics system receives 200 an uploaded flight plan or flight plan update, and performs 202 a plurality of rule-based checks on the flight plan. The flight plan or flight plan update is rendered along with a current flight plan in a visually distinct way. The system may then receive 204 crew approval.

In at least one embodiment, the avionics system may perform a procedural database update prior to performing 202 the plurality of rules-based checks. The rules may include checks for procedural validity; verifying that all procedures are valid. Current and procedural database updates occur every twenty-eight days, with interim updates every fourteen days. Even those updates may not be sufficient; the avionics system may update the procedural database to identify, for example, navions that are out of service, runways that are closed, taxiways that are closed, limitations at certain air traffic control facilities, lighting that's out of service, etc. The avionics system may then apply those checks for procedural validity according to rules in the plurality of rules-based checks.

Figure 3:
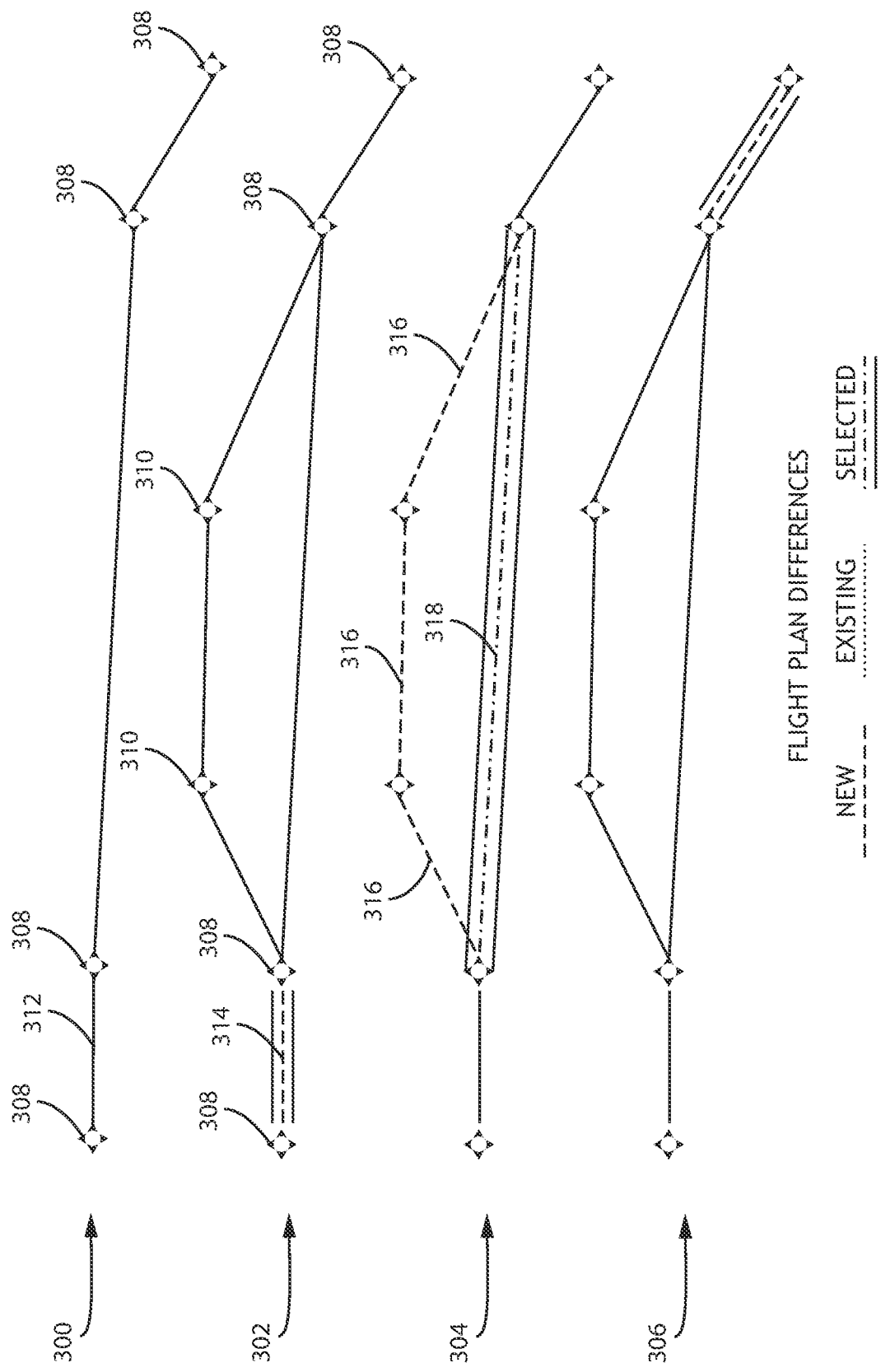
FIG. 3 shows a graphical representation of renderings according to an exemplary embodiment.

Referring to FIG. 3, a graphical representation of renderings according to an exemplary embodiment is shown. An avionics system may render an initial flight plan 300 including a plurality of waypoints 308 and corresponding segments 312, 314, 316, 318 between those waypoints 308. In at least one embodiment, the avionics system may receive a new flight plan or updates to the initial flight plan 300, and render a combined flight plan 302, 304, 306 for review by the crew.

In at east one embodiment, the initial flight plan 300 and combined flight plans 302, 304, 306 are divided into segments 312, 314, 316, 318 and the segments 312, 314, 316, 318 are correlated such that alternative segments in the combined flight plans 302, 304, 306 are associated with a corresponding segment in the initial fight plan 300. For example, the updated flight plan may define alternative segments 316, including alternative waypoints 310, interposed between existing waypoints 308; the alternative segments 316 are associated with an initial segment 318 of the initial flight plan 300 such that a crew member my select the initial segment 318 and both the initial segment 318 and alternative segments 316 are rendered to indicate both are selected. The crew may thereby easily review proposed changes to the initial flight plan 300, segment-by-segment.

In at least one embodiment, flight crew may select flight path segments 312, 314, 316, 318 to see a visual representation of changes embodied in the flight plan update. For example, when reviewing a flight plan update, a selected segment may be unchanged between the initial flight plan 300 and the flight plan update; the initial and updated segments 314 would overlap. In at least one embodiment, the visual representations may be complementary such that when the initial and updated segments 314 overlap, they produce a characteristic visual display indicating no change (i.e., interleaved green and orange dashed line portions).

By comparison, where the flight plan update embodies a change to a segment, selecting the initial segment 318 would cause the initial segment 318 to be rendered in a style indicating that segment is part of the existing flight plan, while simultaneously rendering the alternative segments 316 in a different style indicating that segment is part of the flight plan update. The flight plan update becomes the existing flight plan once accepted by the flight crew.

Figure 4:
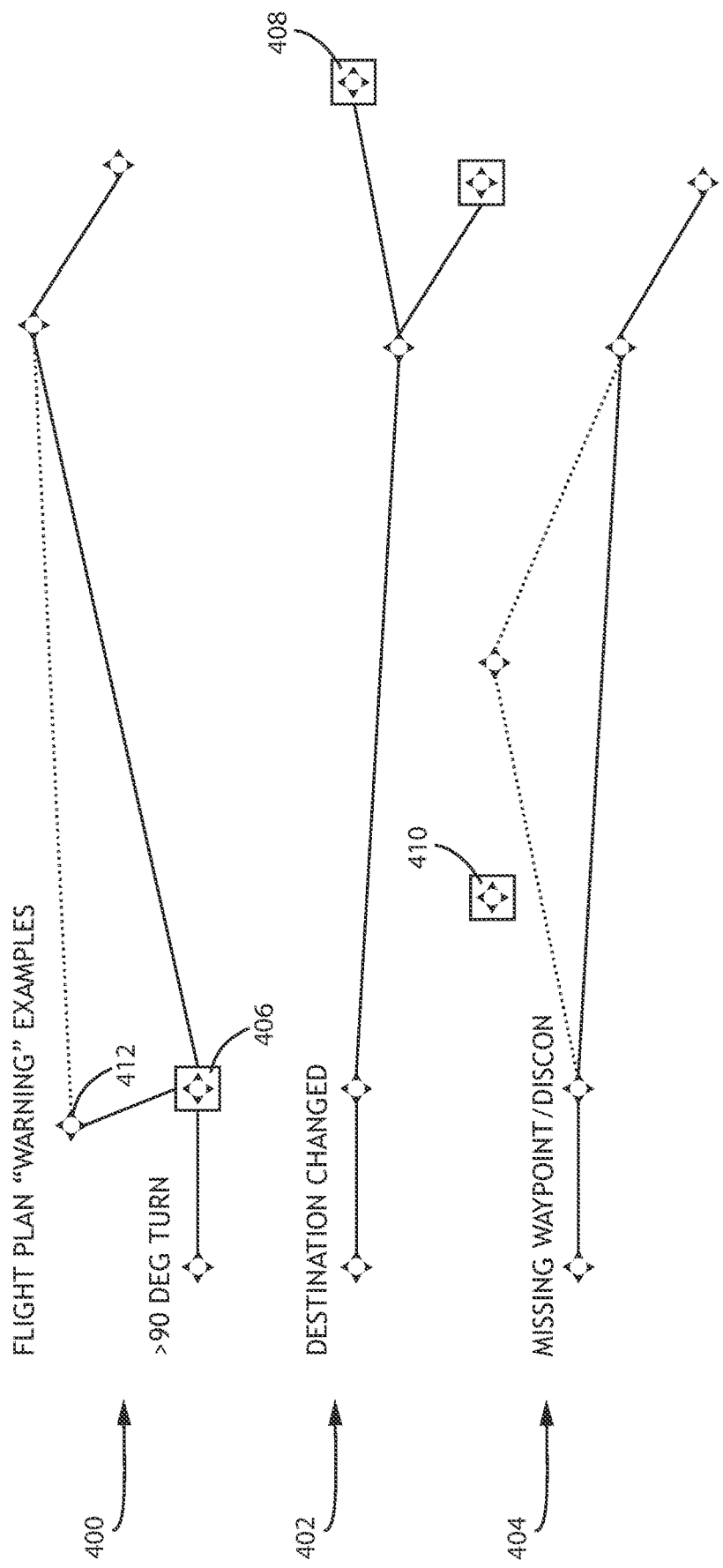
FIG. 4 shows a graphical representation of renderings according to an exemplary embodiment.

Referring to FIG. 4, a graphical representation of renderings according to an exemplary embodiment is shown. In one exemplary embodiment, where a flight plan update 400 includes a new waypoint 412 necessitating a turn at an existing waypoint 406 of greater than some threshold value (i.e., 90°), an avionics system may render the existing flight plan and flight plan update with the segments defining the threshold exceeding turn rendered in a style indicating that portion of the flight plan update violates one of the predefined rules. Furthermore, the avionics system may verify that new waypoints 412 define alternative segments within a tolerance for lateral offsets. For example, the avionics system may determine that the flight plan update defines an alternative segment that is laterally offset from the existing segment by some threshold (i.e., two hundred miles).

In one exemplary embodiment, where a flight plan update 402 includes a new destination 408, an avionics system may render the new destination 408 and corresponding new segments in a stye highlighting the new destination 408 as a violation of one of the predefined rules. A change in destination, unless intentional, should be flagged as a problem.

In one exemplary embodiment, where a flight plan update 404 includes a waypoint 410 (or removal of a waypoint) that creates a flight plan discontinuity, an avionics system may render the waypoint 410 or discontinuous region in a stye highlighting a violation of one of the predefined rules. Discontinuities exist in a flight plan when, for example, the aircraft is cleared to a destination and the flight plan update puts in an approach procedure to get into the destination. The crew would have to interpret whether to go to the destination first and then go back to the start of the approach procedure or where in my flight plan to include the approach procedure. Highlighting those discontinuities allows the crew to resolved the error before executing the flight plan. Furthermore, the flight plan update 404 may include a waypoint 410 that does not exist in an onboard database; such waypoints rendered in a distinct style.

Embodiments of the present disclosure validate a new flight plan or flight pan update before the flight plan update supplants the existing flight plan. Flight crew may continue to focus on the existing flight plan while the flight plan update is quickly validated.

It is believed that the inventive concepts disclosed herein and many of their attendant advantages will be understood by the foregoing description of embodiments of the inventive concepts, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The forms herein before described being merely explanatory embodiments thereof, it is the intention of the following claims to encompass and include such changes. Furthermore, any of the features disclosed in relation to any of the individual embodiments may be incorporated into any other embodiment.

What is claimed is:

1. An avionics computer apparatus comprising:
a display device;
a data storage element; and
at least one processor in data communication with the data storage element, the display device, and a memory storing processor executable code for configuring the at least one processor to:
receive an updated flight plan;
retrieve a set of predefined rules from the data storage element;
apply each of the set of predefined rules to the updated flight plan before the flight plan is accepted; and
render the updated flight plan on the display device,
wherein:
the predefined rules comprise;
a new destination, where the updated flight plan including a new destination is a violation;
a minimum altitude defined by terrain features proximal to segments of the updated flight plan; and
a definition of continuous progressive altitude changes up to a cruising altitude and down to a landing altitude, the definition including a violation if a sequence includes a descent, then a climb, then another descent; and
any violations of the predefined rules are rendered in a visually distinct style.

2. The avionics computer apparatus of claim 1, wherein the at least one processor is further configured to:
retrieve an existing flight plan;
correlate waypoints in the existing flight plan to corresponding waypoints in the updated flight plan; and
render the existing flight plan and the updated flight plan together.

3. The avionics computer apparatus of claim 2, wherein the at least one processor is further configured to render the existing flight plan and the updated flight plan in visual distinct styles.

4. The avionics computer apparatus of claim 3, wherein visual distinct styles are defined to complement each other such that when segments of the existing flight plan and the updated flight plan entirely overlap, overlapping segments are visually distinct.

5. The avionics computer apparatus of claim 1, wherein predefined rules are specific to an aircraft type including the avionics system.

6. The avionics computer apparatus of claim 1, wherein:
the at least one processor is further configured to update a procedural database; and
at least one of the predefined rules includes reference to the procedural database.

7. A method comprising:
receiving, via at least one processor in an avionics computer apparatus, an updated flight plan;
retrieving, via the at least one processor, a set of predefined rules from a data storage element;
applying each of the set of predefined rules to the updated flight plan, via the at least one processor, before the flight plan is accepted; and rendering, via the at least one processor, the updated flight plan on a display device, wherein:
the predefined rules comprise;
a turn of some maximum threshold, where the updated flight plan necessitating a turn exceed the maximum threshold is a violation;
a minimum altitude defined by terrain features proximal to segments of the updated flight plan; and
a definition of continuous progressive altitude changes up to a cruising altitude and down to a landing altitude, the definition including a violation if a sequence includes a descent, then a climb, then another descent;
at least one of the predefined rules are specific to a present aircraft; and
any violations of the predefined rules are rendered in a visually distinct style on the display device.

8. The method of claim 7, wherein at least one of the predefined rules includes a maximum change in a fuel reserve of the present aircraft.

9. The method of claim 7, wherein at least one of the predefined rules includes a check that all waypoints are represented in an onboard database of waypoints.

10. The method of claim 7, further comprising updating a procedural database, via the at least one processor, wherein at least one of the predefined rules includes reference to the procedural database.

11. An avionics system comprising:
a display device;
a data storage element; and
at least one processor in data communication with the data storage element, the display device, and a memory storing processor executable code for configuring the at least one processor to:
receive an updated flight plan;
retrieve a set of predefined rules from the data storage element;
apply each of the set of predefined rules to the updated flight plan before the flight plan is accepted; and
render the updated flight plan on the display device, wherein:
the predefined rules comprise:
a missing waypoint, where the updated flight plan including a flight path with a waypoint that is undefined in the data storage element is a violation;
a minimum altitude defined by terrain features proximal to segments of the updated flight plan; and
a definition of continuous progressive altitude changes up to a cruising altitude and down to a landing altitude, the definition including a violation if a sequence includes a descent, then a climb, then another descent; and
any violations of the predefined rules are rendered in a visually distinct style.

12. The avionics system of claim 11, wherein the at least one processor is further configured to:
retrieve an existing flight plan;
correlate waypoints in the existing flight plan to corresponding waypoints in the updated flight plan; and
render the existing flight plan and the updated flight plan together, each in a visually distinct style.

13. The avionics system of claim 11, wherein at least one of the predefined rules comprises a change to fuel usage check defining a maximum percentage change of fuel usage.

14. The avionics system of claim 11, wherein at least one of the predefined rules comprises a check for flight path discontinuities.

15. The avionics system of claim 11, wherein at least one of the predefined rules comprises a change to destination check.

16. The avionics system of claim 11, wherein:
the at least one processor is further configured to update a procedural database; and
at least one of the predefined rules includes reference to the procedural database.

* * * * *